United States Patent [19]

Buzby

[11] 4,187,762
[45] Feb. 12, 1980

[54] DRIVE AND MOTION SYNCHRONIZING APPARATUS FOR A HYDRAULIC SYSTEM

[76] Inventor: Nicholas L. Buzby, 923 Williams Dr., Palatine, Ill. 60067

[21] Appl. No.: 864,761

[22] Filed: Dec. 27, 1977

Related U.S. Application Data

[63] Continuation-in-part of Ser. No. 768,550, Feb. 14, 1977, abandoned.

[51] Int. Cl.² .......................... F15B 21/02; F15B 7/02
[52] U.S. Cl. .......................................... 91/37; 60/539; 60/581; 60/594; 91/39; 74/56
[58] Field of Search ................. 60/537, 538, 539, 541, 60/543, 567, 571, 572, 573, 581, 592, 593, 594, 565, 586; 91/37, 35, 39; 92/31, 33, 118; 74/56; 417/269

[56] References Cited

U.S. PATENT DOCUMENTS

| | | | |
|---|---|---|---|
| 2,706,891 | 4/1955 | Greer | 60/565 |
| 2,923,131 | 2/1960 | Furman | 60/539 |
| 3,146,596 | 9/1964 | Thompson | 60/593 |
| 3,374,684 | 3/1968 | Greven | 74/56 |
| 3,955,739 | 5/1976 | Markus | 60/539 |
| 4,004,497 | 1/1977 | Scholin | 91/37 |
| 4,116,004 | 9/1978 | Geary | 60/586 |

FOREIGN PATENT DOCUMENTS

| | | | |
|---|---|---|---|
| 123122 | 12/1944 | Australia | 60/565 |
| 7968 | 12/1950 | Fed. Rep. of Germany | 60/571 |

*Primary Examiner*—Abraham Hershkovitz
*Attorney, Agent, or Firm*—Hill, Van Santen, Steadman, Chiara & Simpson

[57] ABSTRACT

An apparatus providing for the generation, control and application of power to a cyclic functioning machine, using fluids under pressure to transmit and control energy by means of a rotary, segmented cam wheel. The cam wheel provides a plurality of interchangeable segments formed into a rim portion with axially spaced complementary counteracting cam faces formed about opposite rim ends. An individual cam follower, carried on a piston rod of a related hydraulic cylinder, coacts with each of the cam faces to accurately regulate the flow of hydraulic fluid to and from a working cylinder of a machine to provide timed and synchronized machine functions through the control movement of the working cylinder. The contoured configuration of the cam faces are arranged to provide for a desired acceleration and retardation of machine motions. Further, variable speed drive means, employed to drive the cam wheel, provides a timing adjustment between machine cycles.

8 Claims, 18 Drawing Figures

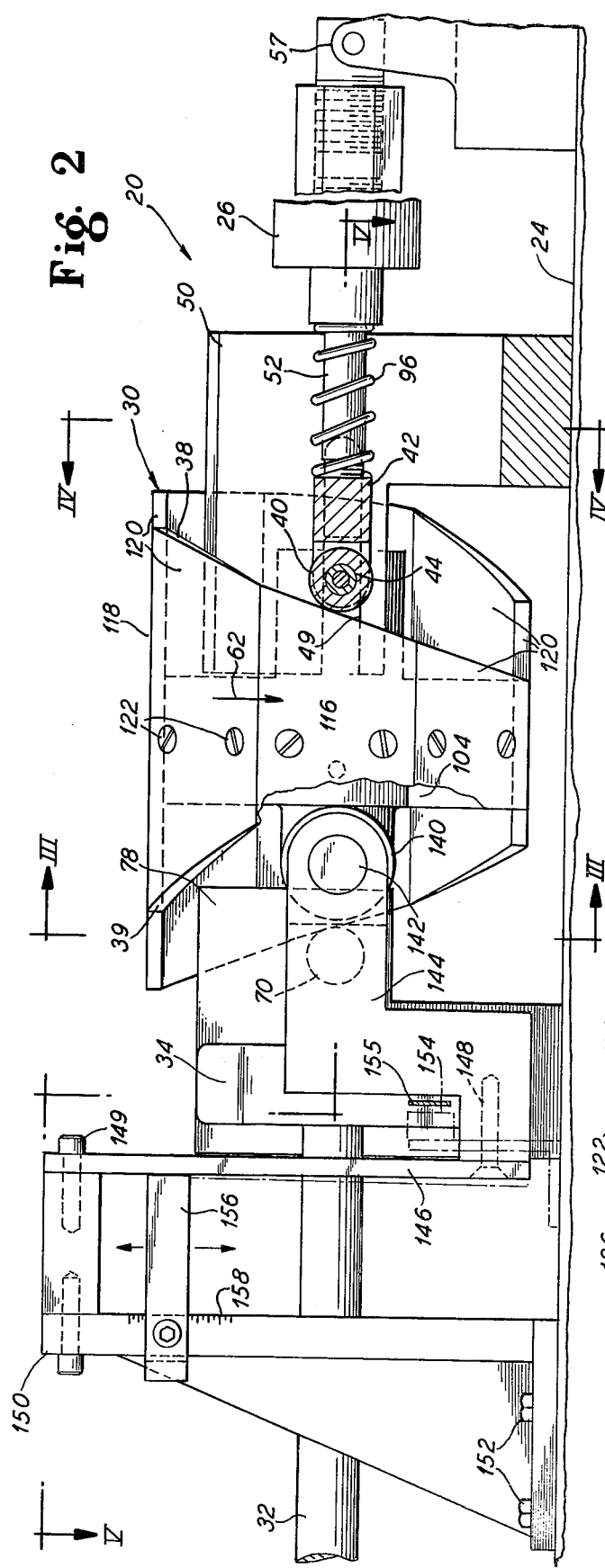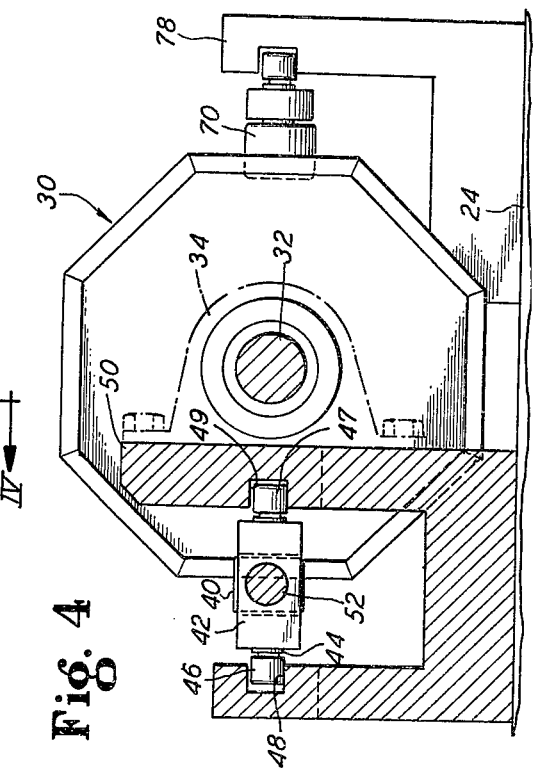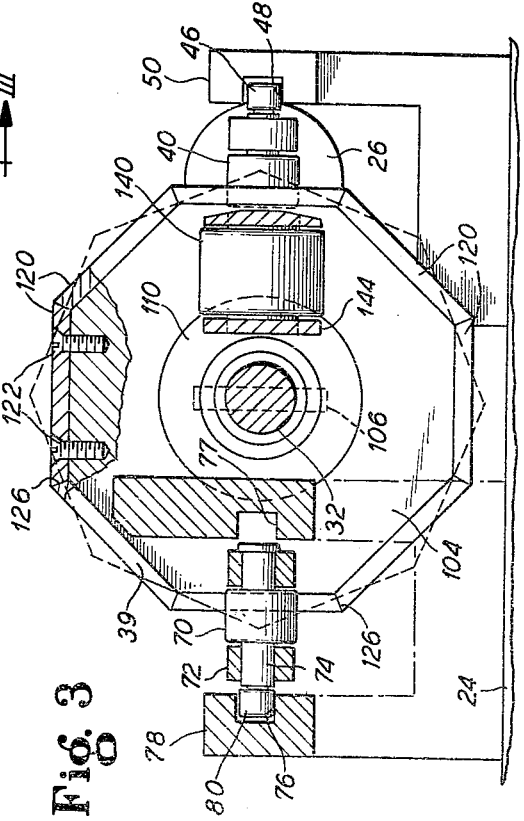

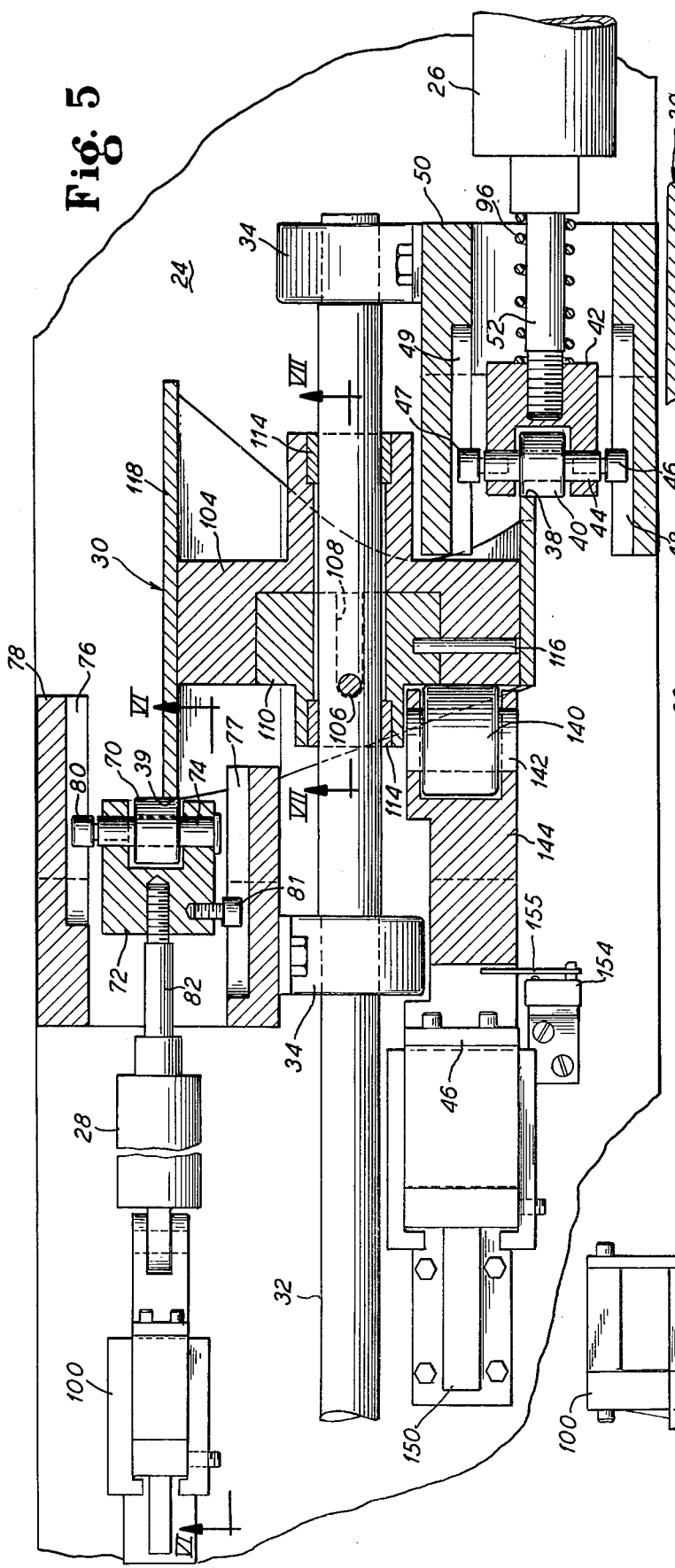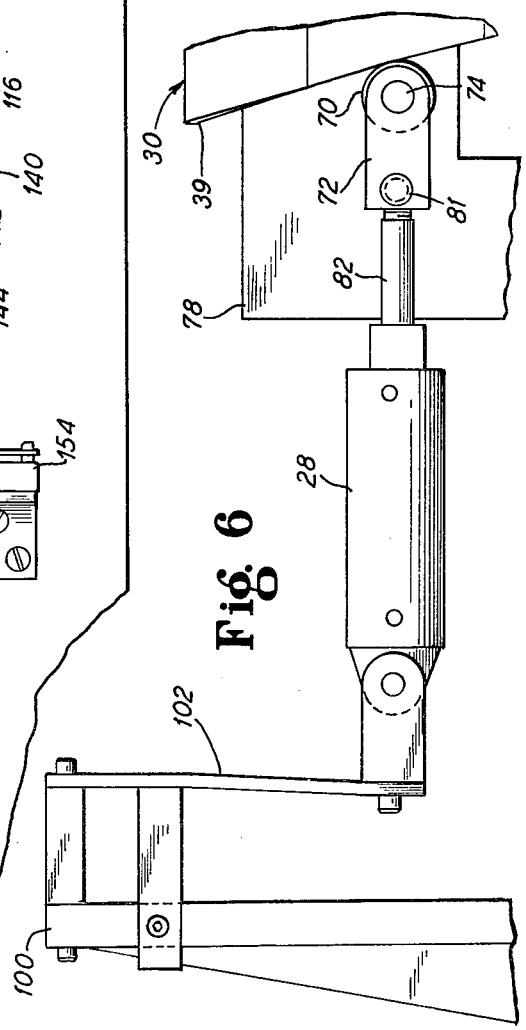

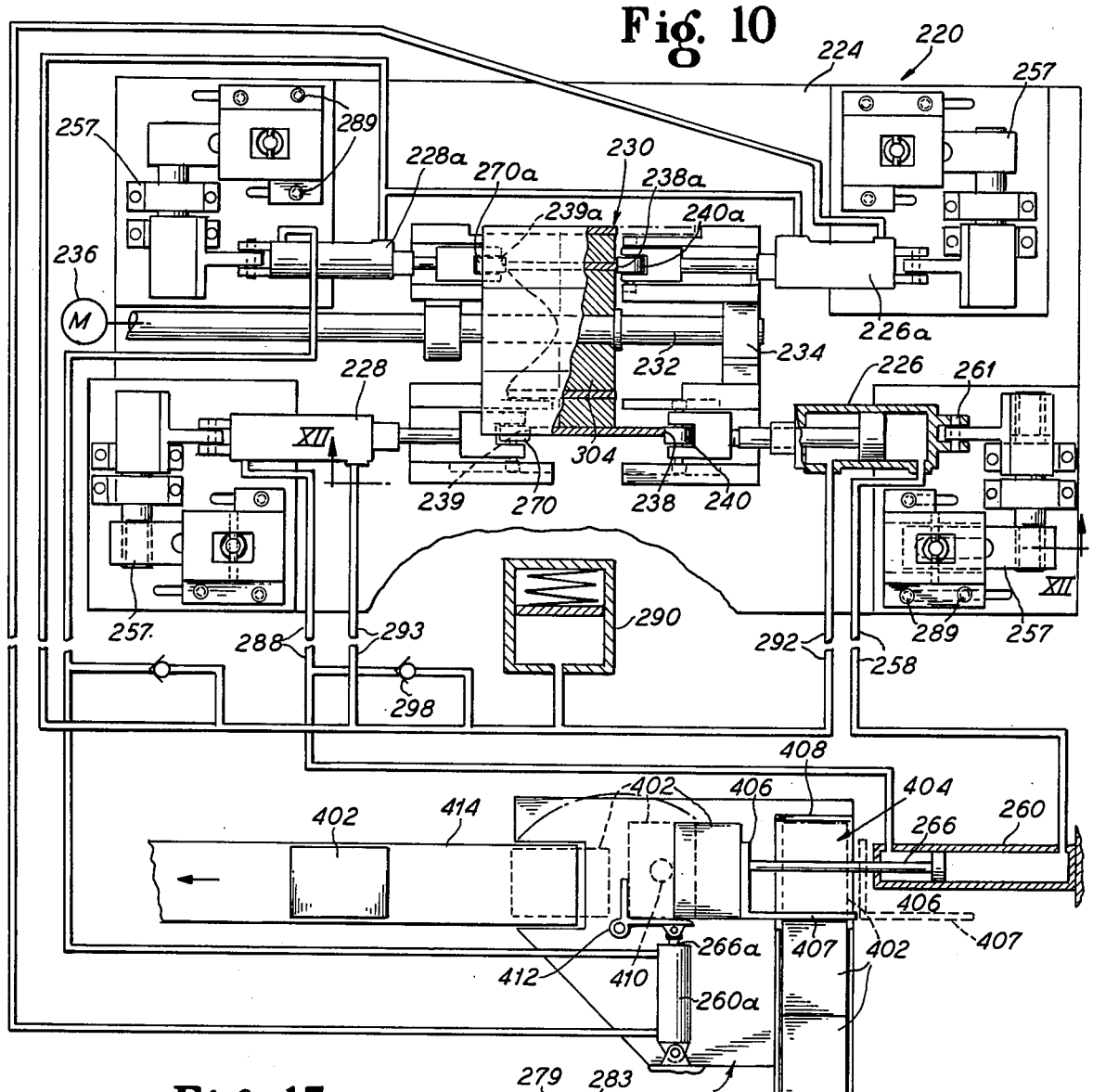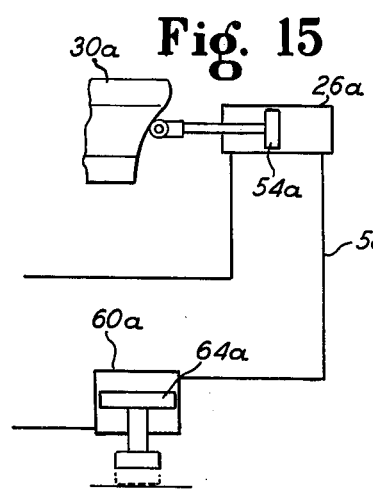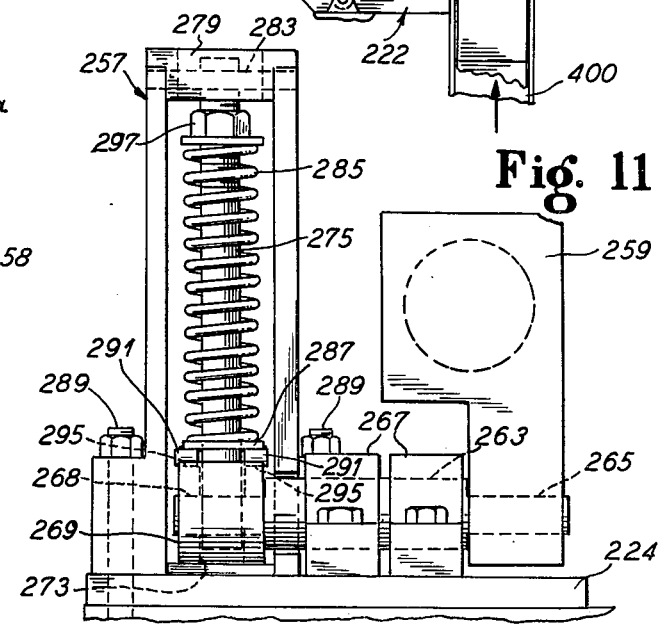

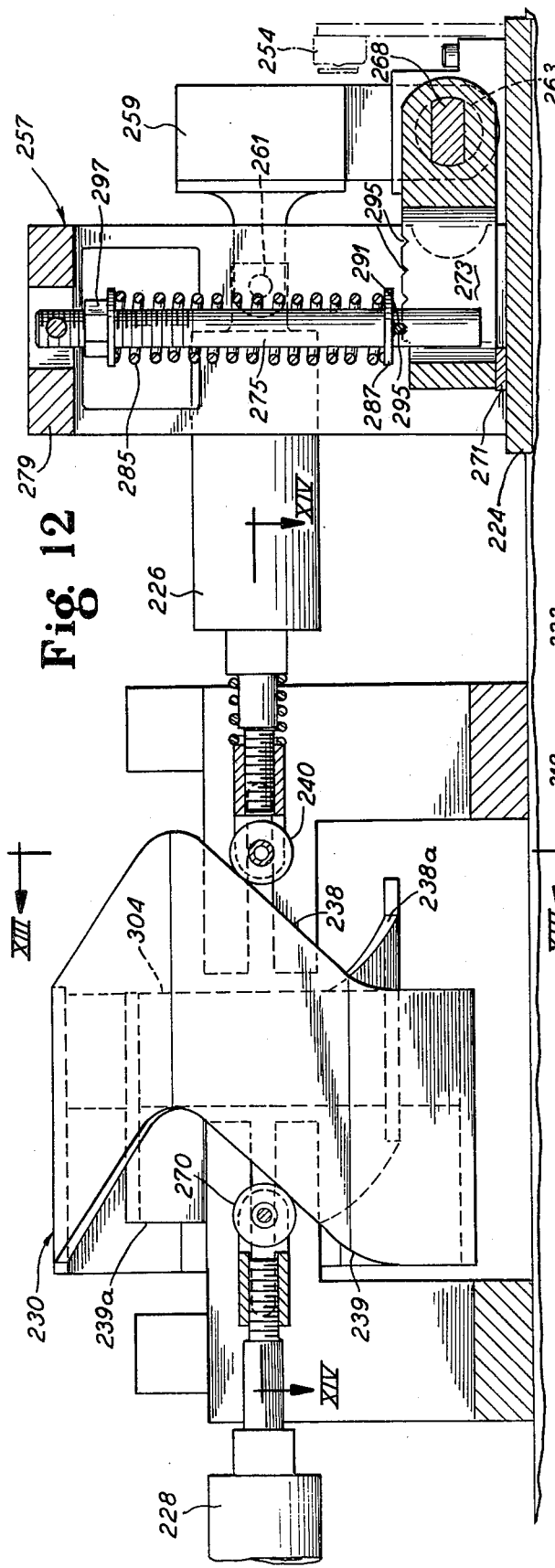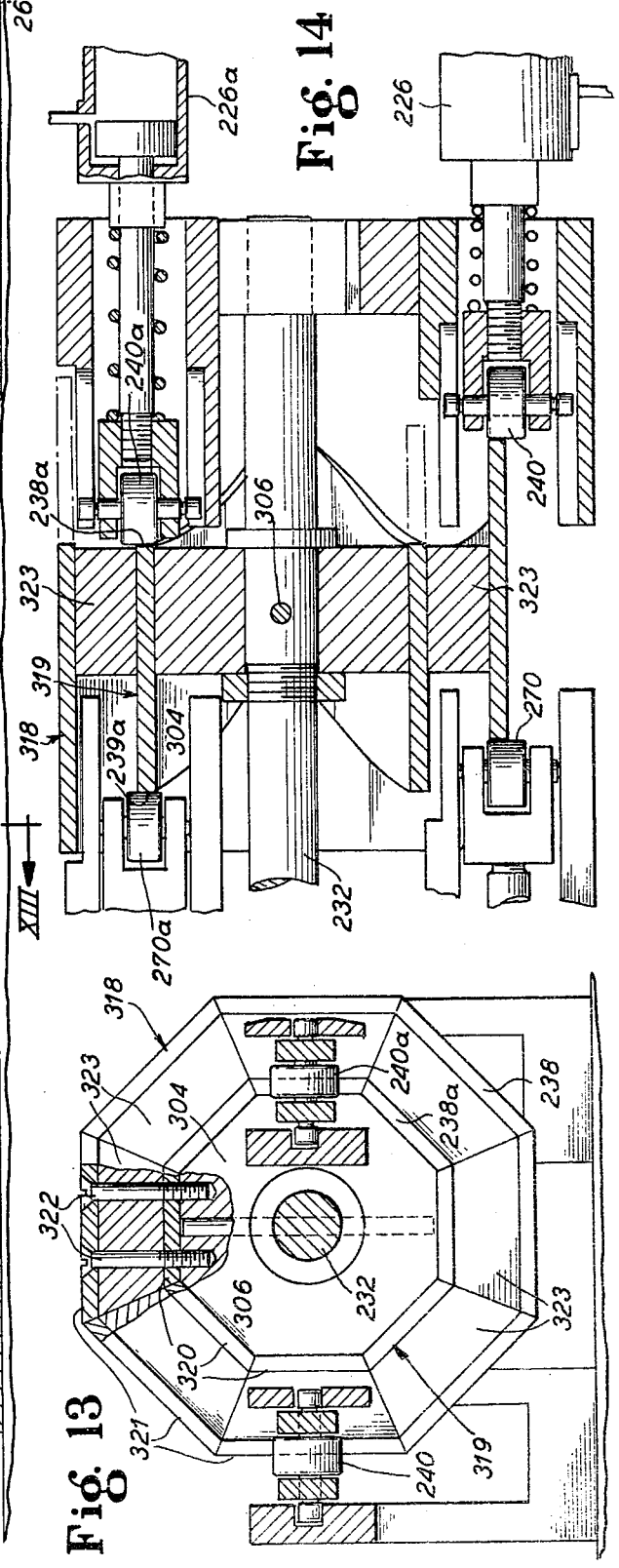

DRIVE AND MOTION SYNCHRONIZING APPARATUS FOR A HYDRAULIC SYSTEM

RELATED APPLICATION

This application is a continuation-in-part of application Ser. No. 768,550, filed Feb. 14, 1977.

BACKGROUND OF THE INVENTION

1. Field of the Invention

This invention relates to drive and motion synchronizing devices and more particularly to a cam-operated device for the generation, control and application of fluid power to operate certain cyclic functions of a machine pressure system.

2. Prior Art

Fluid power systems, while desirable in the operation of many automated machines, require numerous costly and complex components such as pumps, valves, solenoids, relays or solid state controls, limit switch and the like, in order to be utilized and which systems are trouble prone and require substantial maintenance. An all mechanical power and control arrangement to operate machines, on the other hand, becomes quite cumbersome and complex and are not well suited for automatic control or in providing adjustable overload protection. Further, machines that are to operate in hazardous environments preclude the use of controls which might generate a spark or flame at the operating site. This problem has entailed the use of special and very expensive explosion-proof components.

Various hydraulic systems have been utilized to transmit fluid power by means of pressurizing a master cylinder to provide a hydraulic fluid force to activate a slave cylinder, such as utilized in an automotive braking system. These systems, however, do not provide for a reliable controlled back-and-forth motion of the slave cylinder, having sufficient accuracy for adapting such a system to a machine for developing suitable work forces offering complete control of a cyclic functioning machine such as certain metal removing machines, robot devices, machine presses, certain loading and transfer functions in assembly and packaging equipment as well as many other machinery applications.

SUMMARY OF THE INVENTION

The present invention is directed to a device for the generation, control and application of smooth, effective fluid power to operate a machine fluid pressure system in a continuous cyclic mode with full synchronization of motions and work forces developed by a cam-operated pressure transmitting and control apparatus. This apparatus provides a variable speed driven cam wheel with a generally cylindrical rim portion having a pair of contoured cam faces formed on opposite rim edges, each of which coact with a cam follower to produce a power stroke in a related power control cyclinder supporting the cam followers. Each power control cyclinder is connected to an opposite end of a machine function work cylinder by a pressure line to accurately extend and retract the work cylinder in a time relationship in accordance with required machine functions.

The cam faces are complementarily contoured to alternately produce fluid pressure in the power control cylinders to positively and precisely control the movements of the work cylinder, continuously throughout each machine cycle without resorting to complex control components.

Fluid pressure, upon entering the work cylinder at one end, responsive to pressure provided by one of the power cylinders to extend or retract the piston, causes the piston to expel fluid from the opposite end. This outflow is utilized to extend the piston rod of the second power cylinder to extensibly move the related cam follower continuously against the cam face during the receding period of cam rotation, whereby exacting movement of the work cylinder is governed by the volume of hydraulic fluid allowed to enter the power/control cylinder in accordance with the cam face contours. Spring compensation means and fluid make-up connections assure continued synchronized control of the machine work cylinder, thereby providing a high degree of accuracy in the system.

The drive and motion synchronizing apparatus may be conveniently located at a safe point relative to the machine which the apparatus serves, and forces rapidly transmitted over considerable distances with relatively little loss of power. Further, large forces can be controlled by much smaller ones, as can long linear movements be provided under complete control of the cam-operated system, which system is designed to stop in case of overloads; thereby guaranteeing the life of the system and the components. Thus, a small force applied to the piston of a small cylinder can be converted into a much greater force acting on the piston of a larger cylinder, or the movements of a large piston through a given distance can produce a much longer movement in the piston of a small cylinder in accordance with the concept of mechanical advantage (input force times distance travelled equals output force times distance travelled).

Thus, by a considered selection of power cylinders and of the work cylinder, a wide range of functional motions can be provided in accordance with specific machine requirements. The power generated and the controlled application of this power to operate a machine is provided with merely a relatively few inexpensive hydraulic components and without the need for an electrical control system generally required in prior devices. Further, selected contoured forms of the cam faces provide appropriate timing synchronization and acceleration and deceleration control of the work cylinder and a variable speed driving means is effective to adjust the period between machine cycles.

The cam wheel rim, having the cam faces thereon, is segmented having interchangeable elements whereby the cam faces may be partially or completely altered by replacing certain rim segment elements. Further, several segmented rim portions, each having a pair of cam faces thereon may be employed on a cam wheel for multiple work cylinder operations. Individual rim segment elements comprise a generally flat slat or strip, upon which cam face contours may be easily plotted and cut without the need for complicated cam cutting equipment.

Most machine functions utilizing motions produced by fluid cylinders may employ the present invention to operate these cylinders. The positive displacement and fixed volume of hydraulic fluid coming from the power cylinders provides an accurate controlled movement of the machine work cylinder without the need for physical stops, limit switches and other involved control devices.

It is therefore an object of this invention to provide an inexpensive drive and motion synchronizing apparatus for operation of a machine fluid pressure system.

It is another object of this invention to provide an improved cam-operated pressure transmitting and motion control apparatus for a cyclic functioning machine.

It is another more specific object of this invention to provide an apparatus to generate, control and apply power to operate a machine function using fluids under pressure to transmit and control energy by means of a rotary, segmented cam wheel.

It is yet another object of this invention to provide a cam-operated pressure transmitting and control apparatus in which the cam is composed of interchangeable cam face segments which are simple to produce and effective in controlling and synchronizing machine functions.

Other objects, features and advantages of the invention will be readily apparent from the following description of several embodiments thereof, taken in conjunction with the accompanying drawings although variations and modifications may be effected without departing from the spirit and scope of the novel concepts embodied in the disclosure, and in which:

FIG. 2 is an enlarged fragmentary sectional view with portions broken away to show the pressure limiting back-up roller in position relative to the cam wheel;

FIG. 3 is a transverse sectional view taken generally along the line III—III of FIG. 2;

FIG. 4 is a transverse sectional view taken generally along the line IV—IV of FIG. 2;

FIG. 5 is a sectional view taken generally along the line V—V of FIG. 2;

FIG. 6 is a fragmentary sectional view taken generally along the line VI—VI of FIG. 5;

FIG. 7 is a fragmentary sectional view taken generally along the line VII—VII of FIG. 5;

FIG. 10 is a view similar to FIG. 1 of a second form of a cam-operated pressure transmitting and control apparatus adapted to simultaneously operate a pair of work function fluid cylinders;

FIG. 11 is an elevational view of the pressure limiting means associated with the one of the power cylinders;

FIG. 12 is a fragmentary sectional view taken generally along the line XII—XII of FIG. 10;

FIG. 13 is a transverse sectional view taken along the line XIII—XIII of FIG. 12;

FIG. 14 is a fragmentary sectional view taken generally along the line XIV—XIV of FIG. 12;

FIG. 15 is a fragmentary diagrammatic view of another configuration of power and work cylinders which may be utilized for certain machine functions;

DETAILED DESCRIPTION OF THE INVENTION

Figure 1:
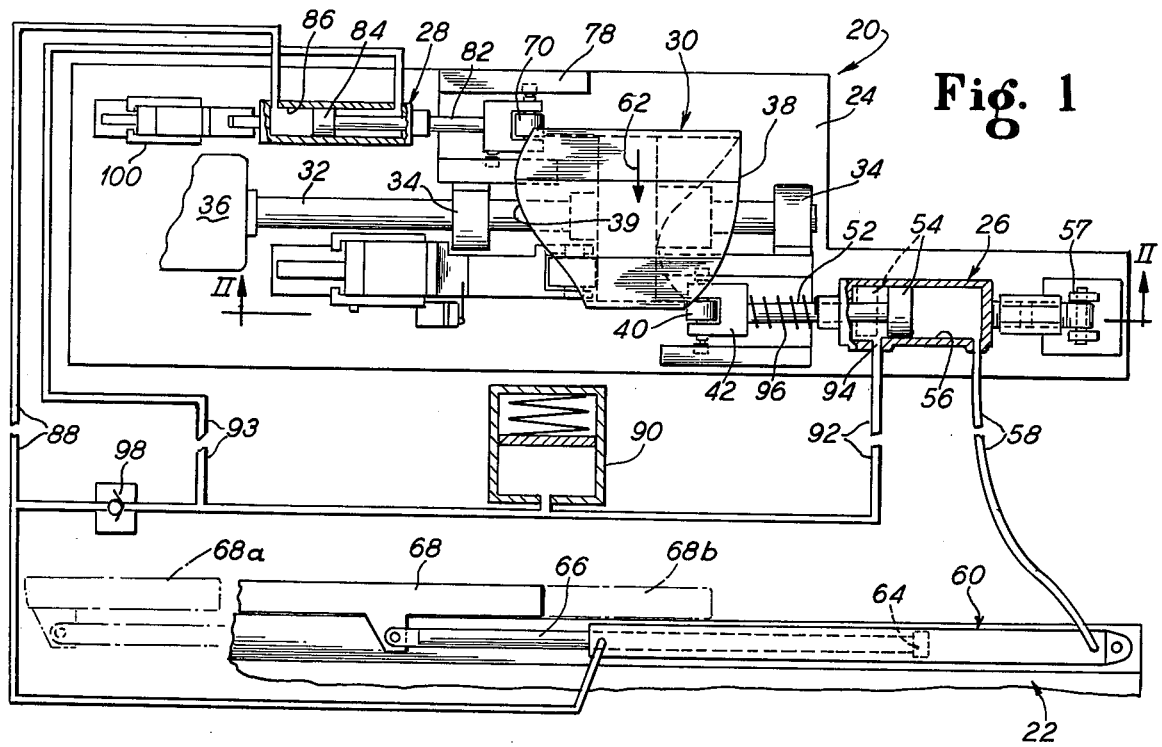
FIG. 1 is a diagrammatic plan view showing a simplified form of a cam-operated pressure transmitting and control apparatus for operation of a machine fluid pressure system embodying features of the invention.

The drive and motion synchronizing apparatus of this invention, of which there are several modifications, is shown in FIG. 1 at 20 as providing for the generation, control and application of power to a cyclic functioning machine 22. The drive and motion synchronizing apparatus 20 includes a base frame 24 supporting a pair of hydraulic power cylinders 26 and 28 and a cam wheel 30. The cam wheel 30 is mounted on a drive shaft 32 and rotatably supported on the base frame 24 by means of bearings 34, 34. The drive shaft is shown as powered directly by a variable speed motor 36, however, it may be driven through the use of suitable gearing (not shown) in which several apparatus drive shafts 32 may be driven from a common power source. Further, the power source need not be contiguous with the machine it serves but may be spaced from it when desirable.

The cam wheel 30 provides a pair of axially spaced cam faces 38, 39 being complementarily contoured and counteractive relative to one another. The cam face 38 is arranged to coact with a cam follower roller 40, carried in a clevis 42 on a mounting pin 44. As best seen in FIGS. 4 and 5, a pair of guide rollers 46, 47, extending from the ends of the mounting pin 44, support the cam follower 40 for movement along a pair of horizontally disposed guide tracks 48, 49, formed in a guide support 50 which is secured to the base frame 24.

The cam follower 40 and clevis 42 are attached to one end of a piston rod 52 which carries a piston 54 at a second end thereof, for axial movement along the inner walls 56 of the cylinder 26. The piston end of the cylinder 26 is adjustably attached to the base frame 24 by means of an anchor support 57 while the piston rod end of the cylinder 26 supporting the cam follower, is slidably carried in the guide support 50.

Thus, it will be seen that as the cam wheel 30 is rotated by the motor 36 in the direction of the arrow 62, the cam face 38 displaces the cam follower 40 to the right as seen in FIGS. 1 and 2. Therein the piston rod 52 and piston 54 are also displaced to the right, forcing hydraulic fluid from the power cylinder 26 and pressurizing a fluid line 58 connected between the power cylinder 26 and a working or slave cylinder 60 of the machine 22. Hydraulic fluid entering the work cylinder 60 forces a piston 64 therein to the left (see FIG. 1) to extend a piston rod 66 in a power stroke direction. The piston rod 66 is attached to a movable member 68 such as a worktable in accordance with the requirements of particular machine functions.

The piston 64 extends the piston rod 66 until the full throw of the cam face 38 displaces the cam follower 40 to its maximum extent, to expel a specific volume of hydraulic fluid from the cylinder 26 (in accordance with the area and stroke of the piston 54) and deliver the fluid into the work cylinder 60. Thus, it will be appreciated that by a considered matching of the cylinders 26 and 60 and by providing a suitable piston stroke of the cylinder 26 (as determined by the cam face contour) a precise control of the movements of the worktable 68 can be obtained with a high degree of accuracy in preforming certain machine functions.

The worktable travel obviously stops when the power cylinder 26 stops delivering pressurized hydraulic fluid to the cylinder 60 and starts to move in an opposite direction when the counteracting cam face 39 effects a discharge flow of hydraulic fluid from the second power cylinder 28 and into the work cylinder 60, in a manner similar to the operation of the cam face 38 and cam follower 40 in controlling the cylinder 26. Herein, a cam follower 70 is supported in a clevis 72 by means of a mounting pin 74 for horizontal movement along a pair of guide tracks 76 and 77 formed in a guide support 78 which is secured to the base frame 24. A pair of guide rollers 80, 81 extending from opposite ends of the clevis 72 provide a rolling support for the cam follower 70 along the guide tracks 76 and 77. A piston rod 82, similar to the piston rod 52, is connected between the clevis 72 and a piston 84 which is movable along the inside walls 86 of the cylinder 28.

As best seen in FIG. 1, when the piston 84 is forced to the left by the camming action of the cam face 39 against cam follower 70, hydraulic fluid is expelled from the power cylinder 28 to pressurize a fluid line 88 connected to the work cylinder 60 remote from the connection of the fluid line 58 and communicating with an opposite side of the piston 64. Accordingly, the piston 64 is forced to the right (FIG. 1) shifting along therewith the piston rod 66 and the attached worktable 68 in a retracting direction. Thus, as the cam wheel 30 makes one complete rotation, the worktable 68 is translationally moved back-and-forth providing one complete cycle of machine operation. The variable speed motor 36 obviously controls the timing between machine cycles.

Now when the worktable 68 moves to the right by reason of hydraulic fluid entering the cylinder 60 through the fluid line 88 to shift the piston 64 to the right, hydraulic fluid is forced from the piston end of the cylinder 60 and moves through the fluid line 58 to be returned to the power cylinder 26. The hydraulic fluid entering the cylinder shifts the piston 54 to the left along with the piston rod 52 and the attached cam follower 40. Herein, the cam follower 40 is extensibly moved to maintain contact with the cam face 38 during the receding phase of the cam wheel rotation.

A unique arrangement is provided to maintain the effectiveness of the hydraulic system to control the worktable movements, in which the piston rod ends of the power cylinders 26 and 28 are connected to a pressurized reservoir 90 by tank lines 92 and 93 which is effective to keep the cylinders filled with hydraulic fluid. This assures constant and precise volumetric flows to the work cylinder 60 for accuracy in controlling the movable member 68, regardless of any minor leakage which may develop in the system that could otherwise effect the synchronizing qualities of the machine operation.

Herein, the piston 54 of the cylinder 26 is arranged to move leftward, as shown in broken lines in FIG. 1, to clear a port 94 of the cylinder 26 which serves as a connection to the tank line 92. Thus, any small volumetric losses of hydraulic fluid from the cylinder on the pressurizing side of the piston 54 can be replenished from the pressurized reservoir 90. A spring 96, biasing the piston rod and cam follower against the cam face 38, insured that the piston will always reach this position. Accordingly, each stroke of the piston 54 will deliver a consistent volume of hydraulic fluid to the work cylinder 60, which includes the fluid discharge from the cylinder 26 after the port 94 is sealed by piston 54 and to the full extent of the power stroke. Further, any leakage associated with the piston end of cylinder 28 is replenished by the pressurized reservoir 90, allowing make-up oil to enter the pressure line 88 through a check valve 98, whenever the volume of oil coming from the piston rod end of the work cylinder 60 is insufficient to maintain the cam follower 70 in contact with the receding cam face 39.

A yieldable anchor support 100 is utilized to provide some degree of flexibility in supporting the power cylinder 28 to accommodate axial displacement of the cam wheel 30 in the event of jamming or overloads of the movable member 68. Further, the yieldable anchor support 100 can compensate for minor differences in the volumetric flow between the work cylinder 60 (piston rod end) and the power cylinder 28 (piston end). Obviously these cylinders are carefully matched to minimize differences in their capacities. The support 100 provides a spring means 102 for mounting the cylinder 28 to the base frame 24.

Figure 9:
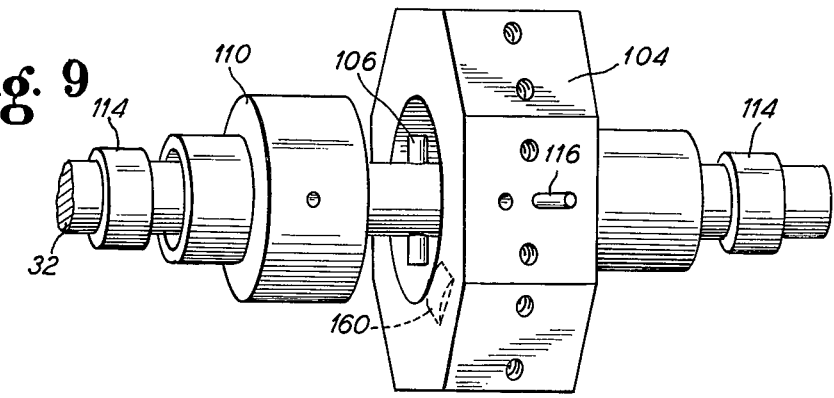
FIG. 9 is a fragmentary exploded view of the driving shaft and hub upon which the rim segment elements are assembled.

Now with specific reference to FIGS. 5, 7 and 9 of the drawings, the cam wheel 30 comprises a mounting hub 104 drivably coupled to the drive shaft 32 by means of a keying pin 106. A pair of keying slots 108, formed in an inner portion 110 of the hub 104, permits the entire cam wheel 30 to shift axially to the left, as best seen in FIG. 7, on lineal bearings 114 in the event of an overload or malfunction which stops the flow of hydraulic fluid in the pressure system. The hub 104 is drivably secured to the inner portion 110 by a drive pin 116.

The cam wheel 30 further includes a generally cylindrical rim portion 118 which is divided into a plurality of chordal segments 120 and individually attached to the hub 104 by flat head machine screws 122, as best seen in FIG. 3. In the preferred form of the invention, the chordal segments 120 are fabricated from flattened slat members 124 (see FIG. 8) which allows the cam face contours to be formed by simple cutting means such as a band saw or an abrasive band machine without the need of the usual elaborate cam milling procedures. The slats are beveled as at 126, for assembly on the hub 104 in a generally octagon smooth surface configuration. However, in some instances, it may be desirable to utilize curved segments 120 which when assembled on the hub 104 will define a true circular configuration.

The cam faces 38 and 39, formed on opposite ends of the slat members 124 are counteracting, providing a generally mirror-image relative to one another with respect to the cam followers communication with its related cam faces. Therefore, as the cam face 38 forces the cam follower 40 to the right in a power stroke direction at a given velocity (see FIG. 5), to pressurize the power cylinder 26 and thereby extend the piston rod 66 of the cylinder 60, the cam face 39 recedes at the same rate allowing the cam follower 70 to move an equal amount to the right in a return direction to recharge the cylinder 28 with hydraulic fluid subsequent to its next pressure producing power stroke.

The cam faces 38 and 39 are contoured to produce certain machine functions, as, for example, those functions which are associated with the back-and-forth movement of the worktable 68, in timed and synchronized relationship providing both acceleration and retardation with accurate positioning of the worktable without physical stops or complex electrical controls.

Figure 8:
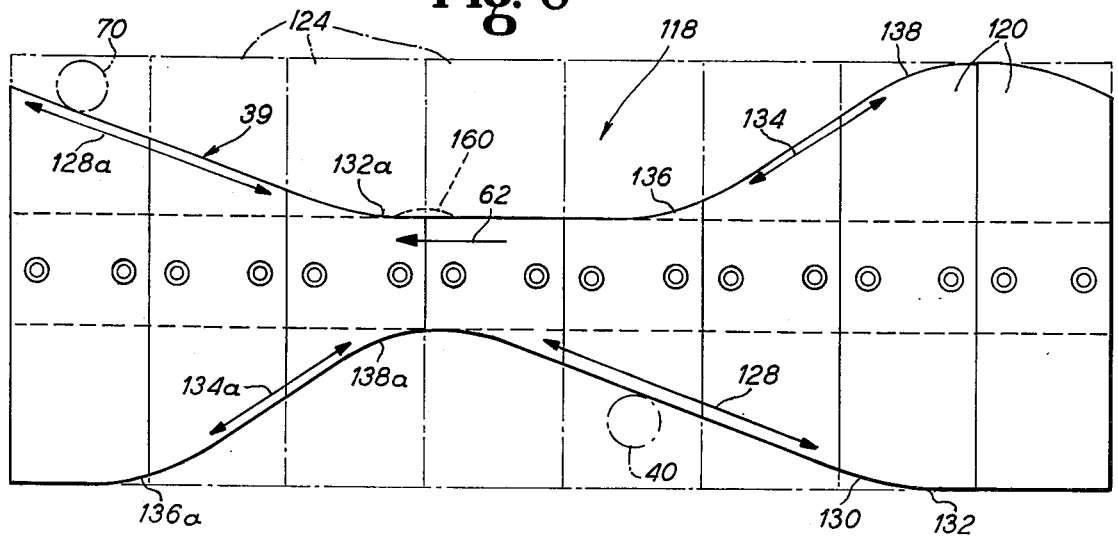
FIG. 8 is a developmental view of the rim segment elements showing the complementary contoured cam faces formed thereon.

As best seen in the diagrammatic developmental showing of FIG. 8, the cam faces 38 and 39 may be formed with a shallow velocity slope as indicated by the arrow 128 for providing a power stroke in the cylinder 26 by the outward camming of the cam follower 40 to extend the work cylinder 60 and consequently the worktable 68 at a moderate velocity when the cam wheel rotates in the direction of the arrow 62. The diametrically opposed cam follower 70 recedes inward at an equal rate along the velocity slope 128a. The cam follower 40 decelerates when reaching the cam face contour at 130 and at point 132 has reached the limit of its outward travel. Herein, the full predetermined volume of hydraulic fluid has been passed out of the power cylinder 26 and into the work cylinder 60 and the movable machine worktable 68 has reached its maximum extended dotted line position 68a (see FIG. 1). Thus, it will be understood that the cylinders are not forced to "bottom" at the ends of their strokes whereby no stresses are imposed on the cylinder packing glands. At this point the cam follower 70 is at a complementary position 132a along the cam face 39 and thereafter moves in a power stroke direction along a steep velocity slope, indicated by the arrow 134 to return the worktable 68 to the dotted line position 68b (FIG. 1) at a high velocity. The cam follower 40 at this time is moved inward along a complementary slope, indicated by the arrow 134a, by the fluid expelled from the piston end of the cylinder 60 through the fluid line 58 and into the cylinder 26. Acceleration and retardation are provided during this power stroke as at 136, 136a and 138, 138a. Since the hydraulic system comprises a generally closed pressure system the worktable 68 can only move in response to the pressure flows between the power cylinders 26 and 28 and the work cylinder 60 to assure positive control of the worktable throughout the machine operating cycle.

Accordingly, it will be understood that any suitable velocities with appropriate acceleration and deceleration characteristics may be provided for obtaining varied and diverse machine functions by simple cam path development with ordinary band saw or friction cutting of handdrawn motions.

It will also be readily seen from FIG. 1 that a stroke length advantage may be had by the small inside diameter cylinder 60 being paired with the larger inside diameter power cylinder 26, whereby the volume of fluid moved during the output stroke of cylinder 26 equals the volume of fluid entering the cylinder 60, and accordingly the smaller piston 64 is required to move an increased distance, proportional to the difference in the area between the pistons 64 and 54. In the example shown in FIG. 1, the stroke of the work cylinder 60 is about five times greater than the stroke of the power cylinder 26, with, of course, a corresponding decrease in force applied to the piston 64.

Now with specific reference to FIGS. 2 and 5 of the drawings, it will be seen that a back-up roller 140 rides against the hub 104 to counteract the thrust associated with pressurizing the cylinder 26. The roller 140 is carried on a shaft 142, supported in one end of a thrust bracket 144, and generally aligned with the cam follower 40. A second end of the thrust bracket 144 is connected to a lower end of a vertically extending leaf spring 146 by means of screws 148. The upper end of the leaf spring 146 is secured by screws 149 to a pedestal 150 which is attached to the base frame 24 by means of screws 152. The leaf spring 146 is of sufficient thickness to resist normal thrust loads imposed thereon by the camming action of the cam wheel 30, but is responsive to excessive loads associated with stalling or jamming of the movable member 68 to permit the cam wheel 30 to shift to the left (FIG. 2) and thereby limit the force of the camming motion.

A limit switch 154 may be used to shut down the drive motor 36 if an overload condition develops. Herein, the leftward shifting of the cam wheel 30 is effective to close the switch contacts 155 and deenergize the motor.

The maximum work force produced by the camming motion is adjustably set by means of a slide abutment 156 carried on the pedestal 150. The slide abutment 156 is arranged to increase or decrease the effective length of the leaf spring 146 in order to vary its stiffness and thereby establishing the loading at which point the leaf spring 146 will deflect. Calibrations 158 may be provided on the pedestal 150 for visually setting the maximum loading of the leaf spring 146 and accordingly the maximum work force delivered by the camming motion of the cam wheel 30. In a few instances it may be desirable to stop the motor 36 at the completion of each machine cycle. Herein a lobe 130 may be provided on the hub 104 (as best seen in FIGS. 8 and 9) at an appropriate location along the path of roller 140 to shift the thrust bracket 144 against the limit switch 154 and shut down the motor 36.

Referring now to FIGS. 10 to 14 of the drawings, a second embodiment of the invention is disclosed providing a drive and motion synchronizing apparatus 220, arranged to operate a cyclic functioning machine 222. The apparatus 220 includes a base frame 224, supporting two pair of hydraulic master power cylinders 226, 228 and 226a, and 228a and a cam wheel 230. The cam wheel 230 is generally similar to the cam wheel 30 of the FIG. 1 embodiment, being rotatably supported on a drive shaft 232 by a pair of bearings 234 and driven by a suitable drive motor 236, having a variable driving speed adjustment. The cam wheel 230 is provided with two pair of cam faces 238, 239 and 238a, 239a. The cam faces 238 and 238a are complementarily formed and counteractive to the cam faces 239 and 239a in a manner somewhat similar to the FIG. 1 embodiment. However, in this embodiment the cam faces 238 and 238a through the camming motion of related cam followers 240 and 240a provide a pressure stroke in the cylinders 226 and 226a in accordance with cam face contours to extend work cylinders 260 and 260a and the cam faces 239 and 239a, through the camming motion of related cam followers 270 and 270a provide a pressure stroke in the cylinders 228 and 228a to retract the work cylinders 260 and 260a. The cam faces are arranged to provide timed and sequenced movements of cylinder piston rods 266 and 266a to control and synchronize a number of machine functions.

The hydraulic system, including a pressurized reservoir 290 and fluid connecting lines are similar to the system described with reference to the FIG. 1 embodiment, except for the utilization of a dual system needed for the operation of the pair of slave or work cylinders 260 and 260a. Each of the cam followers is guided and performs in a manner similar to the FIG. 1 embodiment; however, the cylinders are each supported at their piston ends by an anchor support 257 which is attached to the base frame 224.

As best seen in FIG. 10, the machine 222 comprises a packaging apparatus or the like having an infeed conveyor 400 adapted to deliver a stream of empty containers 402 to a transfer station 404. In operation, at the start of each machine cycle the piston rod 266 of the work cylinder 260 will be fully retracted so that push member 406 connected to the piston rod 266 will be in the dotted line position shown in FIG. 10. The first in line container 402 supported on the conveyor 400 will move against a stop plate 408 after which the pusher member 406 will be activated through the cam motion of the cam follower 240 to push the container 402 to the solid line position and beyond to a fill position shown in broken lines in FIG. 10. In this position, the empty container 402 rests below a filling spout 410 whereupon the pusher member 406 is returned to its original starting position. A second stop plate 407, extending at right angles from the pusher member 406 prevents the second in line container 402 from advancing until the pusher member 406 is fully retracted and the container is able to advance into the transfer station 404 and against the stop plate 408 in readiness for the next fill cycle.

After the first container 402 has been filled, the second work cylinder 206a is activated to pivot a swingable pusher member 412 through a 90° arc to place the now-filled container 402 in a desired orientation on a carry-away conveyor 414 for transfer out of the machine 222.

The cam wheel 230 comprises a mounting hub 304 fixedly secured to the drive shaft 232 by a pin 306 and further includes a pair of segmented radially spaced rim portion 318 and 319 attached to mounting hub 304 by screws 322, as best seen in FIG. 13, with spacers 323 interposed between the rim portions 318 and 319. Inner rim portion 319 includes chordal segments 320, having cam faces 238a and 239a formed at opposite ends thereof in the manner previously described for the rim portion 118 of the FIG. 1 embodiment. The outer rim portion 318 includes chordal segments 321 having cam faces 238 and 239 formed at opposite ends thereof, also as above described. The development of the cam faces and their activating contours, are, of course, arranged to meet certain power and timing requirements as dictated by the specific application for which the drive and motion synchronizing apparatus is to be used.

The anchor supports 257 for supporting each of the four power cylinders are generally identical in their form and action, so only one will be described herein in detail. A rocking arm 259 is attached to the cylinders by means of a pin 261 for supporting the piston ends of the cylinders. The rocking arm 259 is fixed by a keying end portion 265 to a rocker shaft 263 which is pivotably supported on the base frame 224 by means of a pair of bearing supports 267. The rocker shaft 263 includes a second keying end portion 268 for mounting a thrust adjustment lever arm 269 thereon. The thrust adjustment lever arm 269 in normal operation rests horizontally on a pad 271 and is provided with a central cavity 273 to receive a biasing shaft 275 therein. The biasing shaft 275 is suspended from a hanger frame 279 by means of a pin 283 and is provided with an adjustable spring 285 for urging a biasing ring 287, carried about the biasing shaft 275, against the thrust adjustment lever arm 269. The hanger frame 279 is secured to the base frame 224 by means of bolts 289 providing for adjustable movement of the hanger frame 279 relative to the thrust adjustment lever arm 269, whereby a pair of locating pins 291 attached to the lower side of the biasing ring 287 are brought into vertical alignment with a selected pair of detent notches 295. The detent notches 295 include a plurality of locating recesses formed in the top surface of the thrust adjustment lever arm 269, on each side of the cavity 273. It will be readily seen that as the hanger frame 279, carrying the biasing shaft 275, the spring 285 and the biasing ring 287 is adjustably shifted to the farthest left position as shown in FIG. 12, the locating pins 291 will align with the detent notches 295 farthest from the rocker shaft 263 and thus providing a maximum length lever arm 269 to counter the thrust forces associated with the camming action during the power strokes of the cylinders.

Conversely, by adjusting the hanger frame 279 to the right wherein the locating pins 291 seat in the detent notches 295 closest to the rocker shaft 263, a minimum length lever arm is obtained and accordingly, a minimum force can be produced during the power stroke of the cylinders. Further, by adjusting a nut 297, threaded on the biasing shaft 275 the biasing force of the spring 285 can be regulated.

Thus, an adjustment is provided for each power cylinder to limit the fluid pressure produced, which pressure is compatible with a specific machine function. When an overload is encountered and the fluid pressure in the system exceeds the maximum permitted by the adjustment, and since the cam wheel continues to rotate, the now non-retracting cylinder forces the rocker arm 259 to pivot the rocker shaft 263, which lifts the thrust adjustment lever arm 269 upward against the bias of the pre-loaded spring 285. Herein, the flow of the hydraulic fluid from the power cylinder to the work cylinder is stopped to prevent damage to the machine. Further, as in the FIG. 1 embodiment, a limit switch 254 may be provided to turn off the drive motor 236 (see FIG. 12) in the event to an overload condition. Obviously, the anchor supports 257 may be adapted for use with the FIG. 1 embodiment if desired.

FIG. 15 shows a partial diagrammatic arrangement of another form of the invention which can be adapted for use with the drive and motion synchronizing apparatus shown in FIG. 1 or FIG. 10. In this embodiment, a power cylinder 26a is provided which coacts with a cam wheel 30a to pressurize the line 58 connected to a work cylinder 60a. Herein, the area of piston 64a is approximately four times larger than the area of piston 54a. Thus, a small force applied to the small piston 54a can be transformed into a much greater force acting on the large piston 64a. However, since work output can never exceed work input the increase in output force is accomplished by a proportional decrease in the distance the output force moves the piston 64a. In the example shown in FIG. 15, the force applied to the output piston 64a increased four times, but the distance the force moved the piston 64a is one-fourth that of the piston 54a.

Thus, by means of the contours formed on the cam faces and the utilization of compatible cylinder diameters, a fully synchronized, high-speed, apparatus is provided having a high degree of accuracy of all motions and with appropriate work forces delivered to the machine hydraulic system by the cam driven motion synchronizing apparatus.

Figure 16:
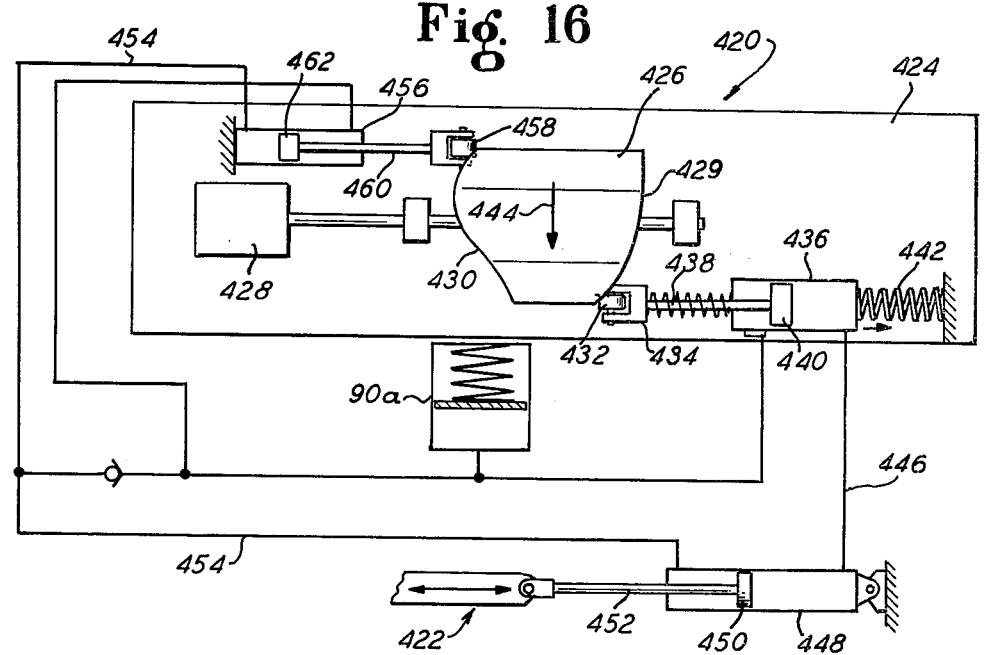
FIG. 16 is a diagrammatic view somewhat similar to FIG. 1, but showing a modified form of the invention.

Now with specific reference to FIG. 16, another form of the invention provides a drive and motion synchronizing apparatus 420 shown diagrammatically arranged to operate cyclic functioning machine 422. The apparatus 420 includes a base frame 424 having a cam wheel 426 rotatably supported thereon and suitably driven by a variable speed drive motor 428 in a manner similar to the FIG. 10 embodiment. The cam wheel 426 is provided with a pair of axially spaced cam faces 429 and 430, being generally complementarily contoured and counteractive relative to one another. The cam face 429 is arranged to coact with a cam follower roller 432, carried in a clevis 434 of a power cylinder 436. The clevis 434, in turn, is attached and supported (not detailed) at one end of a piston rod 438 of the power cylinder 436 in the manner similar to that of the cylinder 36 of the FIG. 1 embodiment. A piston 440 is carried at a second end of the piston rod 438 for axial movement along the inner walls of the cylinder 436. The cylinder is mounted to the base frame 424 by means of a yieldable connection as, for example, a spring member 442 to permit some limited axial displacement of the entire cylinder during operation of the apparatus.

As the cam wheel 426 rotates in the direction of the arrow 444, the cam face 429 displaces the cam follower 432 to the right as seen in FIG. 16. Therein, the piston rod 438 and piston 440 are also displaced to the right forcing hydraulic fluid from the power cylinder 436 and pressurizing a fluid line 446, connected between the power cylinder and the piston end of a work cylinder 448. The work cylinder 448 may be arranged to provide many types of repetitive cyclic functions, as, for example, hydraulic fluid entering the work cylinder 448 forces a piston 450 therein to the left (see FIG. 16) to extend a piston rod 452 in a power stroke direction. The piston rod 452 may be attached to a movable member (not detailed) associated with certain functions of the machine 422.

Herein, the piston rod 452 may extend only in accordance with the ability of the piston 450 to expel fluid from the piston rod end of the work cylinder 448. The piston rod end of the cylinder 448 is connected by a pressure line 454 to a power/control cylinder 456 which is fixedly mounted to the base frame 424 and has a cam follower roller held in engagement with the cam face 430 of the cam wheel 426. The cam follower roller 458 is connected to one end of a piston rod 460 with a piston 462 carried at a second end of the rod 460 for movement along the inside walls of the cylinder 456.

It will be immediately seen that the piston 462 can only extend the piston rod 460 and the attached cam follower roller 458 in accordance with the receding contoured configuration of the cam face 430. Thus, the cam face contours are in direct control of the work cylinder's power stroke in an extending direction. While the cam face 429 is arranged to extend the power cylinder 436 in generally matched movements with the requirements of the work cylinder extension, a slight excessive contour of the cam face 429 is provided to insure developing a positive pressure force in the line 446. Since, however, the work cylinder 448 limits its fluid in flow based upon the power/control cylinder 456 to accept its outflow, the additional motion producing contour of the cam face 429 is compensated for by the stiff yieldable spring member 442, whereby the cylinder 436 expels sufficient volumes of fluid to extend the piston rod 452 of the work cylinder as required, with the spring member 442 allowing for some overtravel of the cam follower 432.

During the work cylinder's retraction or return movement of the piston 450 to the right as seen in FIG. 16, the operation is generally identical with the operation of the FIG. 1 embodiment in which the power/control cylinder piston 462 is forced to the left by the advancing contours of the cam face 430 against the cam follower roller 458. Hydraulic fluid is expelled from the power/control cylinder 456 to pressurize the fluid line 454 connected to the piston rod end of the work cylinder 448. Accordingly, the work cylinder piston 450 is forced to the right, carrying along therewith the piston rod 452 to provide a powered retraction movement for a desired machine function. Thus, the hydraulic fluid expelled from the work cylinder 448 serves to return the power cylinder piston to the left along with the piston rod and attached cam follower 432. Herein, the cam follower is extensibly moved to maintain contact with the cam face 429 during the receding phase of the cam wheel rotation. Obviously, when the cam face 430 has displaced the cam follower roller 458 to its maximum, pressure to the work cylinder ceases and concurrently the outflow pressurized fluid from the piston end of the work cylinder 448 ceases to flow to the power cylinder 436. The cam follower roller 432 will at this time be fully extended against the cam face 429 at its maximum point of recession. It should be remembered that the spring member 442 is able to compensate for small volume variations in fluid exchanges between the work cylinder 448 and the power cylinder 436.

Much of the hydraulic system is identical to the embodiment of FIG. 1, including a pressurized reservoir 90a with fluid tank lines and check valves adapted to compensate for small fluid losses (leakage) by providing for make-up oil to enter the cylinders when required, as previously described.

Figure 17:
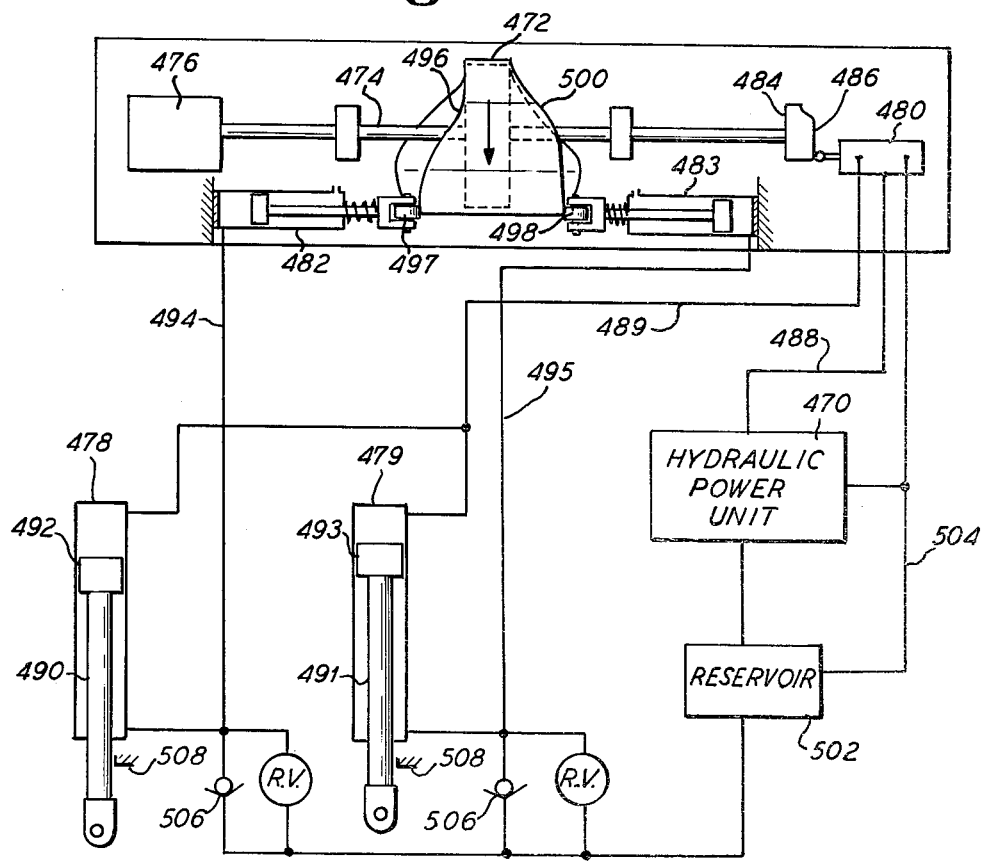
FIG. 17 is a diagrammatic view somewhat similar to FIG. 10, but showing still another form of the invention.

FIG. 17 shows still another form of my invention in which an independent hydraulic power unit 470 is utilized to generate pressurized fluid for the operation of the system. The power unit may be of any suitable design, complete with the usual motor-driven pump and pressure-regulating devices (not detailed). A cam wheel 472, which is suitably mounted on a drive shaft 474 and is rotationally driven by a variable speed drive unit 476, is generally similar in construction to that of the previously described cam wheels.

In this embodiment, a pair of work cylinders 478, 479 are shown, each being extensible to provide a desired machine function under the control of a three-way valve 480 and a related power/control cylinder 482 and 483. The three-way valve 480 is regulated by a cam member 484 affixed to the drive shaft 474 and is arranged to coact with a cam face 486 on the cam member to direct pressurized hydraulic fluid from the power unit 470 to the work cylinders 478, 479 during the receding phase of cam wheel 472 rotation by way of pressure lines 488 and 489. The three-way valve 480 may be utilized to supply hydraulic pressure to a single work cylinder or to two or more work cylinders so long as all the work cylinders are extended simultaneously. Obviously, if a plurality of work cylinders are utilized which in operation require counter or opposed movements in performing their required machine functions, individual valve and cam members will be needed.

Although the pressure source or power unit 470 delivers a steady pressure force to the work cylinders, by way of pressure line 488, valve 480 and pressure line 489, the work cylinder piston rods 490, 491 can extend only in accordance with the ability of pistons 492, 493 to expel fluid from their respective work cylinders. The fluid outflow from each of the work cylinders 478, 479 is directed to a related power/control cylinders 482, 483 by way of fluid lines 494 and 495. In the embodiment shown in FIG. 17, each of the work cylinders is independently controlled relative to its rate and degree of extension by the rate at which a related control cylinder accepts the fluid outflow therefrom. After the work cylinder 478 is fully extended, by reason of a cam follower roller 497 carried by the control cylinder 482 having followed the receding countour of a cam face 496 of the cam wheel 472 to a point of maximum recession relative to the control cylinder 482, the other work cylinder 479 is still able to complete its extendible movement with further fluid outflow therefrom to the control cylinder 483. Herein, a cam follower roller 498, carried by the control cylinder 483, in following the receding contour of a cam face 500 reaches the maximum point of recession subsequent to that of the cam follower roller 497. After both of the work cylinders reach the limit of their extension as permitted by the control cylinders 482, 483, at which time both cam follower rollers 497, 498 are fully extended, the continued rotation of the cam face 486 of the cam member 484 is effective to open the three-way valve 480 to tank, diverting the output of the power unit 470 to a reservoir 502 by way of a tank line 504, and stop the flow of pressurized fluid to the work cylinders. Thereafter, as the cam wheel 472 continues to rotate, the advancing contour of the cam faces 496 and 500 causes the cam follower rollers 497 and 498 to be contractibly displaced to pressurize the power/control cylinders 482, 483. Herein, the fluid lines 494 and 495 carry pressurized fluid to the respective work cylinders 478, 479 to provide a powered retraction movement for a desired machine function. The hydraulic fluid expelled from work cylinders during the retraction movement is discharged to the reservoir 502 via the fluid line 489, through the three-way valve 480 and the tank line 504.

The reservoir 502 is preferably of a pressurized type whereby small fluid losses (leakage) in the hydraulic system can be made up through the use of check valves 506 in the system. Further, relief valves R.V. are provided in the system to protect against pressure overloads. Also, to insure a uniform motion of the work cylinders, stops 508 may be desirable to provide a positive locating point for the start of each machine cycle.

Thus, it will be seen that in the operation of this embodiment, the hydraulic power unit 470 provides a pressure force which is directed to the work cylinders by the three-way valve 480, under the control of the cam member 486. However, the work cylinders 478, 479 can extend only in response to the volume of pressurized fluid allowed to enter the work cylinders to provide a pressure stroke in a first direction. This volume and its rate of flow are regulated by the outflow from the work cylinders to the power/control cylinders 482, 483. The outflow from the work cylinders enters the power/control cylinders in accordance with the extensible movements of the cam follower rollers 497, 498 against the receding contours of the cam faces 496, 500. The work cylinders are retracted by the volume of pressurized fluid produced by the power/control cylinders in accordance with the contractive movements of the cam follower rollers against the advancing contours of the cam faces to provide a pressure stroke in a second direction.

Figure 18:
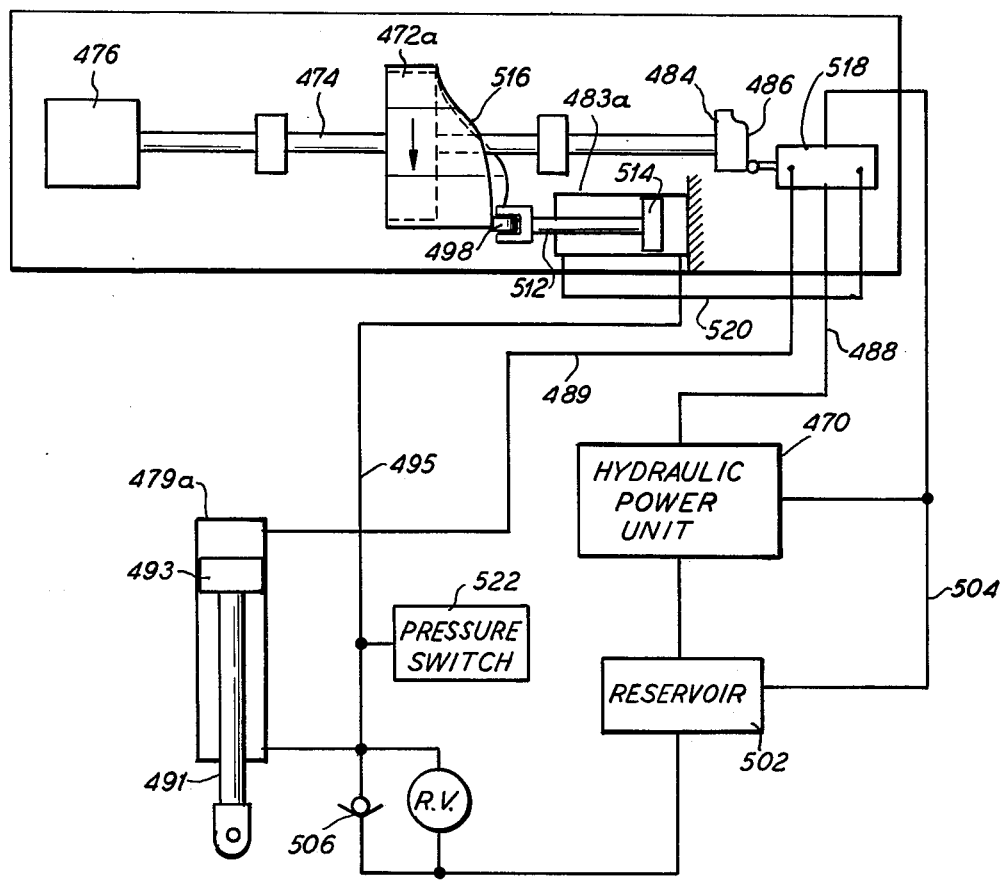
FIG. 18 is a diagrammatic view somewhat similar to FIG. 17, but showing yet another form of the invention.

Obviously, with the use of suitable compatible cylinders the power unit 470 can be arranged to retract the work cylinders or cylinder if only one is utilized. In this arrangement, as it may be seen from FIG. 17, the line 489 may be connected to the piston rod end of the work cylinders 478 and 479 and the lines 494 and 495 may be connected to the work cylinders at their piston ends. Herein, the fluid pressure lines are merely connected to opposite ends of the work cylinders and the power/control cylinders 482, 483 would accordingly regulate the outflow from the work cylinders 478, 479 to control the retractive movements thereof. The work cylinders are extensible by the volume of pressurized fluid produced by the power/control cylinders. Further, it will be recognized that the power unit 470 may be arranged to power a work cylinder in both directions, as for example in instances where generally higher functional forces are encountered in both extending and retracting directions. This arrangement is shown in simplified form in FIG. 18 and includes many of the elements as shown in FIG. 17, which are identified by the same numbers. However, in this embodiment, a single work cylinder 479a is shown requiring a single power/control cylinder 483a which is affixed to the apparatus frame similar to the FIG. 17 embodiment. The power/control cylinder 483a also includes the usual cam follower roller 498 carried at one end of a piston rod 512 extending from the power/control cylinder 483a. A piston 514 is connected to the opposite end of the piston rod 512 and defines individual pressure chambers at each end of the power/control cylinder 483a. The cam follower roller 498 is arranged to move along the contours of a cam face 516 formed along an end area of a cam wheel 472a. A second cam face 486, carried by the cam member 484 provides for the control of a four-way valve 518. The four-way valve 518 is supplied with pressure from the hydraulic power unit 470 by a pressure line 488. The four-way valve is in turn connected to the work cylinder 479a by a line 489 which is effective to direct pressurized fluid to the piston end of the cylinder. Herein, as pressurized fluid enters the work cylinder 479a, forcing the piston 493 in a downward direction as viewed in FIG. 18, the outflow from the work cylinder is directed to the power/control cylinder 483a by way of a line 495. This outflow from the work cylinder 479a is able to enter the power/control cylinder 483a only as permitted by the movement of the cam follower roller 498 along the cam face 516. Thus, it may be seen that the movement of the piston rod 491 in providing certain necessary machine functions is controlled by the ability of the power/control cylinder 483a to accept this outflow.

A second pressure line 520 is connected between the four-way valve 518 and the piston rod end of the power/control cylinder 483a. Herein, fluid at the piston rod end of the power/control cylinder may be returned to tank via the four-way valve 518. With continued rotation of the cam wheel 472a and the cam member 484, the cam face 486 is effective to shift the four-way valve 518 into a position whereby the line 520 becomes the pressure line and the line 489 is then directed back to tank via the four-way valve 518. In this situation, the four-way valve directs pressurized fluid to the piston rod end of the power/control cylinder 483a to provide the positive force in moving the work cylinder 479a in a retracted position. Herein, the power/control cylinder 483a is pressurized by the power unit 470 to retract the piston 514 whereby the outflow therefrom will be directed through the line 495 to the piston rod end of the work cylinder 479a, thus providing a positive force, produced by the power unit, to retract the work cylinder 479 by the utilization of the outflow of the power/control cylinder 483a. Accordingly, it will be seen that the power unit 470 is responsible for the extensive as well as the retractive movements of the work cylinder 479a and the cam wheel 472a is not required to produce the comparatively high forces to retract the work cylinder 479a. Consequently, the cam wheel 472a and the variable speed drive unit 476 may be of a lighter or smaller construction since these items are not required to develop the driving forces in connection with the retraction of the work cylinder 479a.

The usual check valve 506 and relief valve R.V. are provided to compensate for fluid losses and to protect against any pressure overloads. A pressure switch 522 may be placed in the line 495 to sense pressure overloads and shut down the apparatus in the event of such overloads.

Although several embodiments of the invention have been described and defined herein, it is to be understood that other variations and modifications may be effected without departing from the spirit and scope of the novel concepts of this invention.

I claim as my invention:

1. A cam-operated pressure transmitting and control apparatus for the operation of cyclic machine functions comprising:
   a base frame;
   a cam drive means supported on said base frame and having a pair of cam faces thereon;
   means to rotatably drive said cam drive means;
   a first and second fluid pressure generating means each being arranged to coact with a different one of said pair of cam faces;
   a work cylinder means associated with machine functions;
   a hydraulic fluid pressure system interconnecting said work cylinder means and said first and second fluid pressure generating means, whereby said first fluid pressure generating means is responsive to rotation of a first cam face of said pair of cam faces to deliver pressurized fluid to said machine work cylinder means to provide a predetermined pressure stroke therein in a first direction during a first predetermined period of rotation of the cam drive means; and
   cam follower means to accurately control the movement of said work cylinder means in said first direction, being associated with said second fluid pressure generating means and operably engaging a second cam face of said pair of cam faces, and being responsive thereto to regulate a flow of pressurized fluid directed to said work cylinder means by said first fluid pressure generating means by controlling an outflow of fluid from said work cylinder means and
   into said second fluid pressure generating means, wherein said second fluid pressure generating means is responsive to rotation of the cam drive means to regulate a predetermined volume and rate of flow of pressurized fluid delivered to said machine work cylinder means by said first fluid pressure generating means, said second fluid pressure generating means being further responsive to the rotation of said cam drive means to deliver a predetermined volume of pressurized fluid to the machine work cylinder means to provide a pressure stroke in a second direction during another predetermined period of rotation of the cam drive means, said first fluid pressure generating means including a hydraulic power unit having a control valve therefor operably engaged with the first cam face of said pair of cam faces, said control valve being responsive to the rotation of said first cam face to direct pressurized fluid to said work cylinder means to provide said pressure stroke in said first direction and wherein said second fluid pressure generating means includes a power/control cylinder having the cam follower means carried thereon for operable engagement with the second cam face of said pair of cam faces, being responsive to the rotation of said second cam face to control the predetermined volume and rate of flow of pressurized fluid delivered to said machine work cylinder by said hydraulic power unit to provide the pressure stroke in said first direction during said first predetermined period of rotation of the cam drive means by controlling the fluid expelled from said work cylinder means and directed to said power control cylinder and further being responsive to the rotation of said second cam face to deliver said predetermined volume of pressurized fluid to said machine work cylinder means to provide said pressure stroke in said second direction during said another predetermined period of rotation of the cam drive means.

2. The apparatus according to claim 1, wherein said cam drive means includes a generally cylindrical cam wheel having said second cam face thereon and wherein the means to rotatably drive said cam means includes a variable speed drive motor.

3. The apparatus according to claim 1, wherein the hydraulic fluid pressure system includes a means to automatically maintain the hydraulic pressure system filled to insure consistent delivery of the predetermined volume of pressurized fluid to the machine work cylinder.

4. A cam-operated pressure transmitting and control apparatus for the operation of cyclic machine functions comprising:
   a base frame;
   a cam control means rotatably supported on said base frame and including a first and second cam face thereon;
   power means to rotatably drive said cam control means;
   work cylinder means including a work cylinder associated with certain machine functions;
   a fluid pressure generating means arranged to coact with said first cam face to direct pressurized fluid to said work cylinder means;
   regulating means including a power/control cylinder arranged to coact with said second cam face;
   a hydraulic fluid pressure system interconnecting said work cylinder means with said fluid pressure generating means and said regulating means; and
   means to control the movement of said work cylinder comprising a cam follower engaging said second cam face and being responsive to the rotation thereof to control the fluid entering the power/control cylinder which is concurrently being expelled from said work cylinder whereby a predetermined volume and flow of pressurized fluid enters said work cylinder from said fluid pressure generating means to regulate the extension of the work cylinder through a first predetermined pressure stroke movement during a first predetermined period of rotation of said second cam face, said cam follower is maintained in engagement with said second cam face by fluid outflow of said work cylinder and whereby the outflow from said work cylinder is continuously controlled by the movement of the cam follower means along a receding contour of the second cam face to control the motion of said work cylinder means in said first predetermined pressure stroke movement, said pressure generating means includes a hydraulic power unit having a control valve therefor operably engaged with said first cam face, said control valve being responsive to the rotation of said first cam face to deliver pressurized fluid to said work cylinder means to move said work cylinder means in one of said predetermined pressure stroke movements and wherein fluid outflow from said work cylinder and into said power/control cylinder is controlled by the extending movements of said cam follower against said receding contour of said second cam face, said cam follower further being effective to regulate retraction of said work cylinder through a second predetermined pressure stroke movement during a second predetermined period of rotation of the second cam face.

5. A cam-operated pressure transmitting and control apparatus according to claim 4, wherein said power/control cylinder is responsive to an extending contoured portion of said second cam face to deliver said predetermined volume of pressurized fluid to said work cylinder to retract said work cylinder during said second predetermined period of rotation of the second cam face.

6. A cam-operated pressure transmitting and control apparatus according to claim 4, wherein said work cylinder means includes a pair of work cylinders and said cam control means includes a third cam face and said regulating means includes a second power/control cylinder carrying a cam follower thereon whereby the movements of each of the work cylinders in said first predetermined pressure stroke movements is individually controlled by the extending movements of the cam followers against receding contours of the second and third cam faces.

7. A cam-operated pressure transmitting and control apparatus according to claim 4, wherein said hydraulic power unit is arranged to move the work cylinder means through predetermined pressure stroke movements during said first and second predetermined periods of rotation of the cam control means.

8. A cam-operated pressure transmitting and control apparatus for the operation of cyclic machine functions comprising:
 a base frame;
 a cam control means rotatably supported on said base frame and including a first and second cam face thereon;
 power means to rotatably drive said cam control means;
 work cylinder means including a work cylinder associated with certain machine functions;
 a fluid pressure generating means arranged to coact with said first cam face to direct pressurized fluid to said work cylinder means;
 regulating means including a power/control cylinder arranged to coact with said second cam face;
 a hydraulic fluid pressure system interconnecting said work cylinder means with said fluid pressure generating means and said regulating means; and
 means to control the movement of said work cylinder comprising a cam follower engaging said second cam face and being responsive to the rotation thereof to control the fluid entering the power/control cylinder which is concurrently being expelled from said work cylinder whereby a predetermined volume and flow of pressurized fluid enters said work cylinder from said fluid pressure generating means to regulate the extension of the work cylinder through a first predetermined pressure stroke movement during a first predetermined period of rotation of said second cam face, said cam follower is maintained in engagement with said second cam face by fluid outflow of said work cylinder and whereby the outflow from said work cylinder is continuously controlled by the movement of the cam follower means along a receding contour of the second cam face to control the motion of said work cylinder means in said first predetermined pressure stroke movement, said pressure generating means includes a hydraulic power unit connected between a fluid reservoir and a control valve, said control valve operatively associated with said first cam face and being responsive to rotation of said cam control means to deliver a pressurized fluid to said work cylinder means to move said work cylinder means in one of said predetermined pressure stroke movements and wherein fluid outflow from said work cylinder and into said power/control cylinder is controlled by the extending movements of said cam follower means against a receding contour of said second cam face and wherein said control valve being responsive to rotation of said first cam face directs fluid from said work cylinder means to said reservoir when said work cylinder means is moved in a second of said predetermined pressure stroke movements to return said work cylinder to an initial starting position in completing one cycle of machine functions said cam follower further being effective to regulate retraction of said work cylinder through a second predetermined pressure stroke movement during a second predetermined period of rotation of the second cam face.

* * * * *